United States Patent [19]

Smith

[11] Patent Number: 4,802,333
[45] Date of Patent: Feb. 7, 1989

[54] THRUSTERS

[75] Inventor: Peter Smith, Portsmouth, England

[73] Assignee: The Marconi Company Limited, England

[21] Appl. No.: 37,804

[22] Filed: Apr. 13, 1987

[30] Foreign Application Priority Data

Apr. 16, 1986 [GB] United Kingdom ................ 8609228

[51] Int. Cl.⁴ .............................................. F02K 9/42
[52] U.S. Cl. ........................................ 60/260; 244/169
[58] Field of Search ............ 60/260, 736, 267, 39.461; 244/3.22, 169, 172

[56] References Cited

U.S. PATENT DOCUMENTS

| | | | |
|---|---|---|---|
| 2,408,111 | 9/1946 | Truax et al. | 60/260 |
| 2,917,903 | 12/1959 | Stineman et al. | 60/736 |
| 3,097,480 | 7/1963 | Sohn | 244/3.22 |
| 3,597,923 | 8/1971 | Simon | 60/260 |
| 3,614,026 | 10/1971 | Montanino et al. | 244/3.22 |
| 3,733,816 | 5/1973 | Nash et al. | 60/736 |

Primary Examiner—Donald E. Stout
Attorney, Agent, or Firm—Kirschstein, Kirschstein, Ottinger & Israel

[57] ABSTRACT

A thruster for use in a spacecraft uses vaporized propellant in its combustion chamber (110). Normally two propellants are used of the kind used for main thrusters so that two vaporization chambers are needed. Pressure valves (108, 109) are controlled by electronic means (220) to maintain current pressure.

2 Claims, 3 Drawing Sheets

THRUSTERS

BACKGROUND OF THE INVENTION

1. Field of the Invention

The present invention concerns chemical thrusters. Most spacecraft are fitted with small chemical thrusters for attitude and orbit control.

2. Description of Related Art

Existing altitude control thrusters use either cold gas propellant which is simply released under pressure through a valve and a nozzle, or liquid propellant which is converted to hot gas either by a hypergolic reaction with another liquid propellant, or by the action of a catalyst. Both types of thrusters have disadvantages. The cold gas thruster is capable of producing small, highly accurate pulses but at low exhaust velocity, whilst the hot gas thruster produces high exhaust velocity but is incapable of producing extremely small, highly accurate single pulses.

SUMMARY OF THE INVENTION

The present invention has for an object to provide a chemical thruster which affords both a high degree of controllability and a higher exhaust velocity than can be obtained with cold gas thrusters.

Accordingly the present invention consists, from one aspect, in a chemical thruster using a conventional propellant stored in liquid form, the thruster including a vapouriser upstream of the combustion chamber of the thruster so that in operation the liquid propellant is vapourised before combustion.

As a result the propellant may be admitted into the combustion chamber of the thruster in small, controlled amounts.

In this context it will be appreciated that the term "combustion chamber" is intended to cover the chamber in a monopropellant thruster in which the propellant is injected onto a catalyst.

According to a feature of the invention the chemical thruster may be a bipropellant thruster connected to two vapourising chambers each having associated heating means. These vapourising chambers may be remote from the thrusters, and one chamber may supply vapour to more than one thruster, or alternatively the vapourising chambers may be connected directly to the thruster inlet valve, in which case each bipropellant thruster may be fitted with two associated vapourising chambers.

The flow of liquid propellant into the vapourising chamber may be controlled by a valve, or alternatively by a hydrophobic membrane designed to maintain a liquid/vapour barrier by using the surface tension forces of the liquid propellant.

BRIEF DESCRIPTION OF THE DRAWINGS

In order that the invention may be more readily understood the embodiments thereof will now be described by way of example and with reference to the accompanying drawings, in which.

DETAILED DESCRIPTION OF THE PREFERRED EMBODIMENTS

Figure 1:
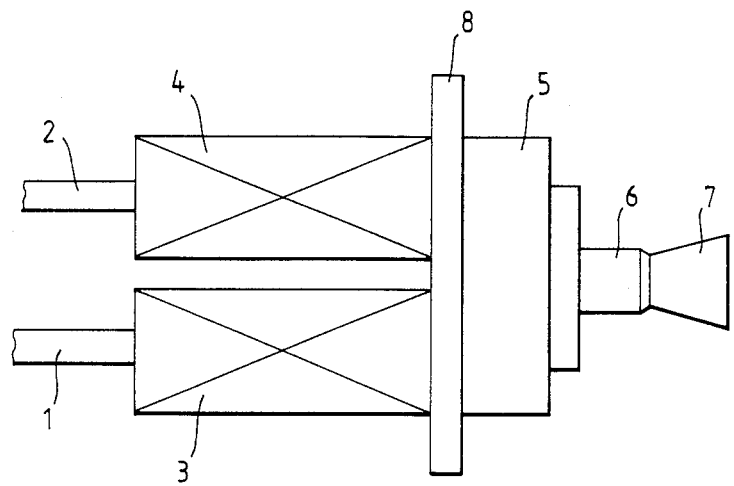
FIG. 1 is a schematic plan view of a chemical thruster according to the present invention which relies on propellant vapour being fed from a remote vapourising chamber.

Referring now to FIG. 1 there is shown a chemical thruster using two propellants which are supplied to the thruster in vapour form from two vapourising chambers (not shown) via propellant inlets 1 and 2.

Typically one of the propellants will be a fuel and the other an oxidising agent. The inlets 1 and 2 lead to inlet valves 3 and 4, which control the propellant flow into the combustion chamber. On flowing through the valves the propellant then enters an injector 5 which controls the propellant as it enters the combustion chamber 6. The combustion products from the combustion chamber are then expanded through nozzle 7 to produce thrust.

The inlet valves, injector and combustion chamber are mounted on a mounting flange 8 which provides support to the thruster and allows the thruster to be fitted to a structure or bracket.

The material of the combustion chamber and nozzle may be a suitable ceramic to minimize heat loss to the combustion chamber walls.

Figure 2:
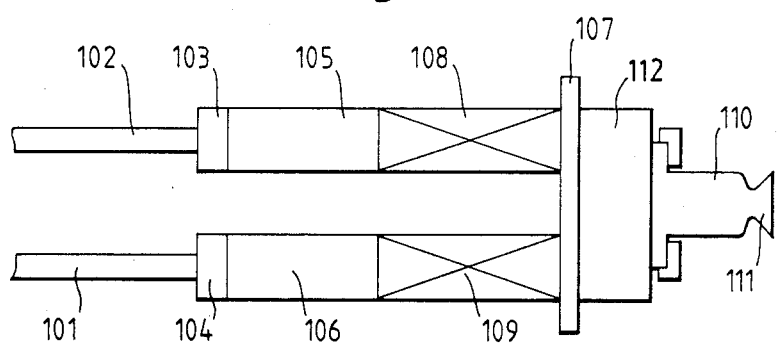
FIG. 2 is a similar view of another embodiment of a chemical thruster according to the invention which is fitted with a hydrophobic membrane to establish a vapourising chamber.

Referring now to FIG. 2 there is shown a chemical thruster using two propellants which are supplied to the thruster from suitable tanks (not shown) via a pair of propellant inlets 101 and 102. As before one of the propellants will typically be a fuel and the other an oxidising agent. The inlets 102 and 101 lead via respective hydrophobic membranes 103 and 104 into vapourising chambers 105 and 106 each associated with an inlet valve and a heater element. The purpose of the two membranes is to maintain a liquid/vapour interface. The chambers 105 and 106 are connected to inlet valves 108, 109 which are fitted to a mounting flange 107. The mounting flange 107, injector 112, combustion chamber 110 and nozzle 111 are the same as those described in FIG. 1.

The heating elements of the vapourising chambers may be arranged to give different temperatures.

Figure 3:
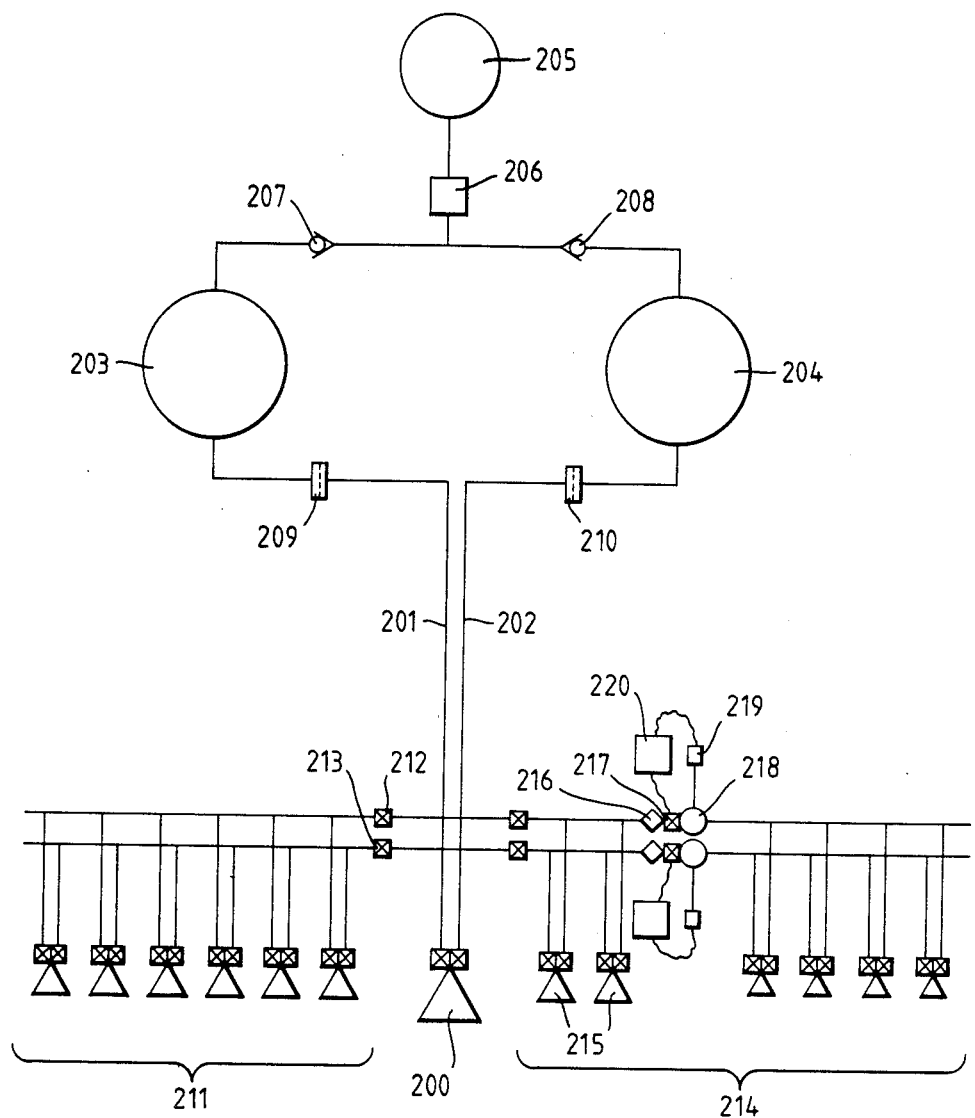
FIG. 3 is a schematic view of a bipropellant system incorporating the thruster of the kind shown in FIG. 1.

Referring now to FIG. 3 of the drawings this shows a bi-propellant system. Part of the FIG. 3 shows conventional thrusters, and part shows thrusters according to the present invention.

The system consists of a bipropellant manoeuvring engine 200 connected directly by propellant conduits 201, 202 to an oxidiser tank 203 and a fuel tank 204. The required system pressure is maintained in tanks 203 and 204 by a pressurant stored in tank 205, and acting via a pressure regulator 206 and respective check valves 207 and 208. The conduits 201 and 202 are fitted with filters 209, 210.

A typical known bipropellant system normally includes two sets of attitude and orbit control thrusters, of which one of these sets 211 being shown. Each set may be isolated using isolation valves 212, 213.

The other set of attitude and orbit control thrusters shown in the second set, namely set 214, is shown as incorporating the present invention. Two conventional thrusters, 215, are also shown in this modified set.

Propellant enters an orifice 216 or similar device to reduce the system pressure. The propellant then flows through a control valve, 217 and into the vapourising chamber 218. The vapourising chamber is fitted with a pressure sensor 219, which monitors the pressure in the chamber, and a temperature sensor (not shown). The chamber and subsequent downstream conduits which carry the propellant vapour may be wrapped with heaters to maintain the propellant in the vapour state.

The output from the pressure sensor is monitored in control electronics 220 which is fitted with a limit switch and valve driver. When the pressure sensor output falls below a set limit, indicating low pressure in the vapourising chamber, the limit switch is operated and this activates the valve driver which drives valve 217 into the 'open' position. Propellant then flows into the vapourising chamber, and on vapourising produces an increase in pressure which is monitored by the pressure sensor. If the limit switch requirement is then exceeded the valve 217 is returned to its 'closed' position.

Figure 4:
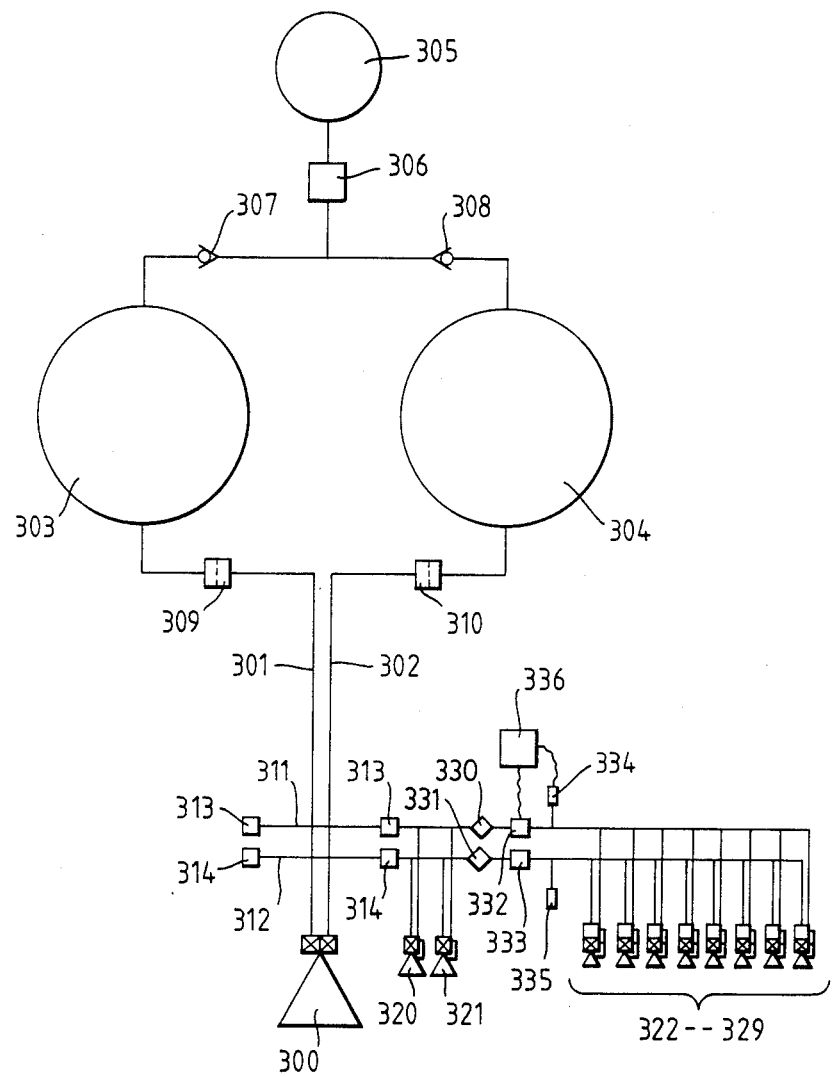
FIG. 4 is a view similar to FIG. 3 of a bipropellant system incorporating a thruster of the kind shown in FIG. 2.

Referring now to the bipropellant system shown in FIG. 4 of the drawings this comprises a bipropellant apogee engine 300 connected directly by propellant conduits 301 and 302 to an oxidiser tank 303 and a fuel tank 304.

The system pressure is maintained in the tanks 303 and 304 by a pressurant, stored in tank 305, and acting via a regulator 306 and respective check valves 307 and 308. The conduits 301 and 302 normally include respective filters 309 and 310.

Biopropellant systems normally consist of two sets of attitude and orbit control thrusters as described in FIG. 3. For the sake of convenience only one set is shown in FIG. 4. All the engines and thrusters receive propellant from the two tanks 303 and 304 via branch conduits 311 and 312 connected to the main conduits 301 and 302 via isolation valves 313 and 314.

Conventional liquid-fed bipropellant attitude and orbit control thrusters 320 and 321 may be combined with the vapour-fed thrusters according to the present invention, as is shown in FIG. 4. These engines are separated from the vapour-fed attitude control thrusters 322 through 329, each of which is of the form shown in FIG. 2, by a pair of orifices 330 and 331, valves 332 and 333 and a pressure feedback system, indicated by the pressure sensors 334 and 335 and control electronics 336 and operating in the same way as the equivalent components described in FIG. 3.

Several variations of the invention are possible, necessitated by the type of propellant, application, and system design.

One variant is a monopropellant thruster in which the liquid propellant, usually hydrazine, is vapourised and the vapour injected onto the catalyst where it spontaneously reacts.

Another is the use of the decomposition products of hydrazine, after passing the liquid through a gas generator, for use as the fuel in a vapour-phase bipropellant thruster. In this application the ammonia produced by the gas generation process would form the fuel. Alternatively, ammonia may be carried in a tank specifically for this application.

Both the bi- and monopropellant thrusters described herein have the advantage that extremely small impulse bits can be achieved whilst using conventional propellants, though other propellants may be used.

I claim:

1. An attitude and orbit control thruster for use in a spacecraft having liquid bipropellant thrusters, comprising:

a combustion chamber having a thrust nozzle;

a fuel tank for containing a supply of liquid fuel;

an oxidizing agent tank for containing a supply of liquid oxidizing agent;

a pair of vaporizing chambers, each having an inlet and an outlet;

first conduit means connected between the fuel tank and the inlet of the one of the vaporizing chambers for conveying the fuel along a first path to said one vaporizing chamber for vaporization therein to form a vaporized fuel, said first conduit means being further operative for conveying the liquid fuel to said liquid bipropellant thrusters;

second conduit means connected between the oxidizing agent tank and the inlet of the other of the vaporizing chambers for separately conveying the oxidizing agent along a second path, separate from said first path, to said other vaporizing chamber for vaporization therein to form a vaporized oxidizing agent, said second conduit means being further operative for conveying the liquid oxidizing agent to said liquid bipropellant thrusters; and means connected between the outlets of the vaporizing chambers and the combustion chamber, for delivering the vaporized fuel and the vaporized oxidizing agent to the combustion chamber for joint combustion therein to generate combustion gases for expansion through the thrust nozzle to produce thrust.

2. A thruster for use in a spacecraft for long range space missions, comprising: a combustion chamber having a nozzle; two vaporization chambers for vaporizing liquid propellants, each connected to a different propellant storage tank; controllable valve means between each vaporization chamber and the combustion chamber; conduit means for directly leading liquid propellant from each storage tank to each vaporization chamber without the intermediary of a pump; pressure control means associated with each vaporization chamber and located between each vaporization chamber and said combustion chamber for maintaining a pre-set minimum pressure in each vaporization chamber; and a main thruster operative for burning the same mixture of propellants in liquid form.

* * * * *